United States Patent
Ludwig et al.

(10) Patent No.: US 10,900,363 B2
(45) Date of Patent: Jan. 26, 2021

(54) LASER TIP CLADDING TO NET-SHAPE WITH SHROUDS

(71) Applicant: HONEYWELL INTERNATIONAL INC., Morris Plains, NJ (US)

(72) Inventors: Brent Ludwig, Phoenix, AZ (US); Don Mittendorf, Mesa, AZ (US); David R. Waldman, Chandler, AZ (US); Malak Fouad Malak, Tempe, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 104 days.

(21) Appl. No.: 16/051,560

(22) Filed: Aug. 1, 2018

(65) Prior Publication Data

US 2020/0040745 A1 Feb. 6, 2020

(51) Int. Cl.
*F01D 5/28* (2006.01)
*B23P 15/02* (2006.01)

(52) U.S. Cl.
CPC .............. *F01D 5/286* (2013.01); *B23P 15/02* (2013.01); *F05D 2230/90* (2013.01); *F05D 2240/307* (2013.01); *F05D 2300/173* (2013.01); *F05D 2300/611* (2013.01)

(58) Field of Classification Search
CPC .... F01D 5/286; B23P 15/02; F05D 2300/611; F05D 2300/173; F05D 2240/307; F05D 2230/90

See application file for complete search history.

(56) References Cited

U.S. PATENT DOCUMENTS

| | | | |
|---|---|---|---|
| 5,743,322 A | 4/1998 | Jackson et al. | |
| 6,154,959 A | 12/2000 | Goodwater et al. | |
| 7,316,850 B2 | 1/2008 | Hu et al. | |
| 8,206,108 B2 | 6/2012 | Riahi et al. | |
| 9,476,304 B2 | 10/2016 | Marchione | |
| 9,816,389 B2 | 11/2017 | Malak et al. | |
| 2004/0126492 A1* | 7/2004 | Weaver | C23C 14/16 427/250 |

(Continued)

FOREIGN PATENT DOCUMENTS

| | | |
|---|---|---|
| DE | 19547903 C1 | 3/1997 |
| EP | 0276404 A1 | 8/1988 |

(Continued)

OTHER PUBLICATIONS

Walston, W.S.; Coating and Surface Technologies for Turbine Airfoils; Superalloys 2004.

(Continued)

*Primary Examiner* — Lawrence Averick
(74) *Attorney, Agent, or Firm* — Lorenz & Kopf, LLP

(57) ABSTRACT

Cladding material is applied by laser to a net-shape. A method of cladding a host component includes installing the component in a fixture. A shroud component is located against the host component adjacent a select location for the cladding. Cladding is applied to the host component to the select location and adjacent to shroud component so that the shroud component defines an edge of the cladding as applied. The edge of the cladding as defined by the shroud component defines a desired cladding profile requiring no/approximately no post-cladding processing to remove over-cladded material.

20 Claims, 19 Drawing Sheets

(56) References Cited

U.S. PATENT DOCUMENTS

| | | | |
|---|---|---|---|
| 2005/0241147 A1* | 11/2005 | Arnold | B23K 35/38 |
| | | | 29/889.1 |
| 2010/0257733 A1 | 10/2010 | Guo et al. | |
| 2011/0003170 A1* | 1/2011 | Darolia | F01D 5/288 |
| | | | 428/633 |
| 2012/0070307 A1 | 3/2012 | Poon et al. | |
| 2012/0222306 A1* | 9/2012 | Mittendorf | B33Y 50/00 |
| | | | 29/889.1 |
| 2014/0072715 A1 | 3/2014 | Jones et al. | |
| 2015/0224599 A1 | 8/2015 | Bruck et al. | |
| 2017/0129053 A1 | 5/2017 | Schruefer et al. | |

FOREIGN PATENT DOCUMENTS

| | | |
|---|---|---|
| EP | 0562130 A1 | 9/1993 |
| EP | 1721699 A1 | 11/2006 |
| JP | 2013194694 A | 9/2013 |

OTHER PUBLICATIONS

Kittel, J.; Automatic Laser Cladding for Turbine Tips; Jun. 2013.
Eboo, G.M., et al.; Laser Cladding of Gas Turbine Components; Quantum Laser Corp.; The American Society of Mechanical Engineers; 86-GT-298, 1986.

* cited by examiner

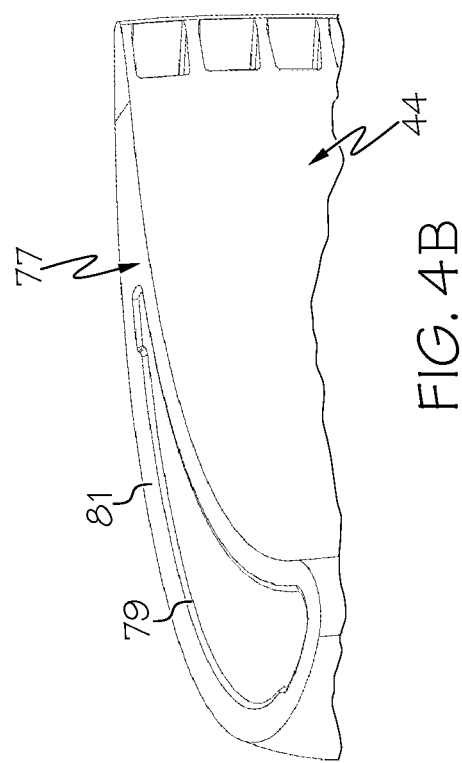
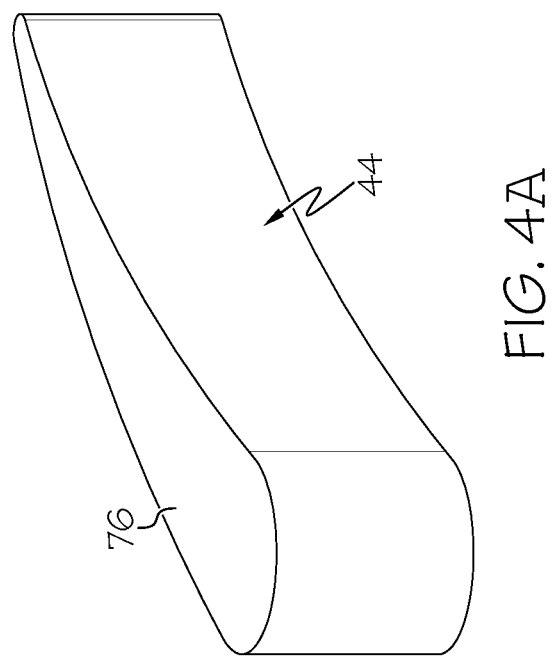

LASER TIP CLADDING TO NET-SHAPE WITH SHROUDS

TECHNICAL FIELD

The present invention generally relates to cladding operations, and more particularly relates to cladding turbine blade tips to a net-shape using laser tip cladding and shrouds as cladding containment tools.

BACKGROUND

Gas turbine engines are generally used in a wide range of applications, such as aircraft engines, aircraft auxiliary power units, surface transportation vehicles, and stationary units. In a gas turbine engine, air is compressed in a compressor, mixed with fuel, and ignited in a combustor to generate hot combustion gases, which flow downstream into a turbine section. In a typical configuration, the turbine section includes rows of airfoils, such as stator vanes and rotor blades, disposed in an alternating sequence along the axial length of a generally annular hot gas flow path. The rotor blades are mounted at the periphery of one or more rotor disks that are coupled in turn to a main engine shaft. Hot combustion gases are delivered from the engine combustor to the annular hot gas flow path, resulting in rotary driving of the rotor disks to provide an engine output.

Turbine blade tip portions are subjected to an acceleration of hot combustion gases moving between the tip portion and the adjacent static structure, which increases the heat transfer across the tip portion, and thus, increases the thermal loading. To withstand the effects of the thermal loading, blade tips may be covered with a tough high-temperature capable material to increase operational capabilities and life. However, manufacturing operations to process the covered blade tip into final dimensional form have proven to be time consuming and costly, and in some blade configurations, exceedingly challenging.

Accordingly, it is desirable to manufacture a turbine rotor blade with an improved manner for forming the blade tip portion while maintaining or improving its operational capabilities and life. Furthermore, other desirable features and characteristics of the inventive subject matter will become apparent from the subsequent detailed description of the inventive subject matter and the appended claims, taken in conjunction with the accompanying drawings and this background of the inventive subject matter.

BRIEF SUMMARY

This summary is provided to describe select concepts in a simplified form that are further described in the Detailed Description section of this disclosure. This summary is not intended to identify key or essential features of the claimed subject matter, nor is it intended to be used as an aid in determining the scope of the claimed subject matter.

In a number of embodiments, a method of cladding a host component, such as a turbine blade, includes installing the component in a fixture. A shroud component is located against the host component adjacent a select location for the cladding. Cladding is applied to the host component at the select location and adjacent to the shroud component so that the shroud component defines an edge of the cladding as applied. The edge of the cladding as defined by the shroud component defines a desired cladding profile.

In other embodiments, a method of cladding a blade for a rotor of a turbine section of an engine includes installing the blade in a fixture. A shroud component is located against the blade adjacent a select location for the cladding. The cladding is applied to the blade at the select location and adjacent to the shroud component so that the shroud component contains the cladding and defines an edge of the cladding as applied, so that the cladding as applied has a desired cladding profile. The edge of the cladding as defined by the shroud component defines the desired cladding profile with a quality requiring no/approximately no further modification of the cladding profile to remove material from the cladding after application In additional embodiments, a method of cladding a blade for a rotor of a turbine section of an engine includes installing the blade in a fixture. A first shroud component is located against an end of the blade adjacent to a select location for the cladding. A second shroud component is located against a side wall of the blade adjacent to the select location. A release agent layer is applied to the shroud components prior to locating the shroud components against the blade. A protective material layer is applied over each of the release agent layers, again prior to locating the shroud components against the blade, so that the protective material layers face the select location when positioned against the blade. The cladding is applied to the blade between the shroud components so that the shroud components define edges of the cladding as applied. The protective material layers are fused to the blade as a result of applying the cladding. The edges of the cladding as defined by the shroud component define a desired cladding profile of a near-net quality requiring approximately no further modification of the cladding profile after application.

BRIEF DESCRIPTION OF THE DRAWINGS

The present invention will hereinafter be described in conjunction with the following drawing figures, wherein like numerals denote like elements, and wherein:

FIGS. 4A and 4B are schematic illustrations of the blade tip area of the turbine rotor blade of FIG. 3, in accordance with exemplary embodiments;

DETAILED DESCRIPTION

Figure 1:
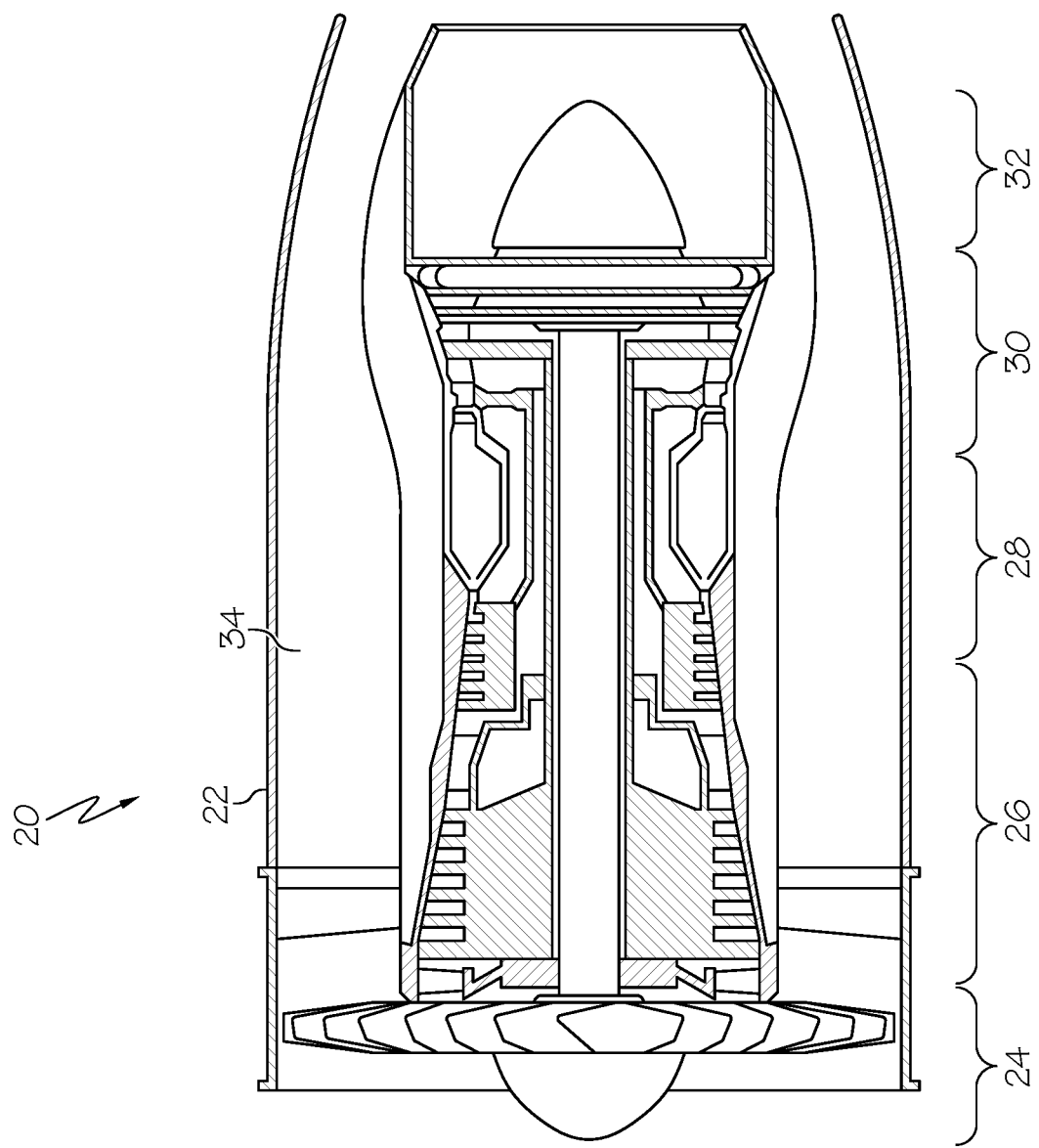
FIG. 1 is a schematic cross-sectional illustration of a gas turbine engine with which the disclosed methods may be used, according to an exemplary embodiment.

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

In general, a host component such as a blade for a rotor of a turbine section of an engine, has an area clad with an added material that is selected for its toughness and heat resistance. For example, the end of the blade may be clad to form the blade's tip in a desired shape and from the selected material, which has a higher durability than the remainder of the blade. During fabrication, the blade is installed in a fixture. A cladding containment tool in the form of a shroud component that acts as a shroud is located against the blade adjacent to a select location for the cladding, such as the blade end/tip. The cladding is applied to the blade adjacent to the shroud component so that the shroud component defines an edge of the cladding as applied. The edge of the cladding as defined by the shroud component defines a desired cladding profile of a near-net quality requiring no/approximately no further modification of the cladding profile after application. No/approximately no modification means little or no post cladding machining or processing to bring the profile of the added cladding into specifications for the blade's final design profile. In other words no, or approximately no, over-cladded material needs to be removed from the blade post cladding. In some embodiments, where design specifications are met, the blade may be assembled in an engine with no post cladding machining. In other embodiments, specifications may require post processing such as sanding or polishing rather than milling or other forms of substantial cutting. In some embodiments, a release agent layer is applied to the shroud component prior to locating the shroud component against the blade, and a protective layer such as a platinum aluminide layer is applied over the release agent layer. The protective layer is fused to the blade as a result of applying the cladding.

In the examples given herein, clad host components and cladding methods are described in association with a high-pressure turbine for an aircraft gas turbine engine, but the disclosure is not limited in utility to such an application. In the example of a high-pressure turbine, the location adjacent a combustor makes the environment challenging for material durability. Accordingly, clad features are useful in the application, since especially durable material may be added to a somewhat less durable material at areas of highly erosive or corrosive exposure. The current disclosure is applicable to other applications when the addition of material to withstand the environment is needed, including in high temperature environments. So, although described in the aircraft context, various features and characteristics disclosed herein may be used in other contexts and applications where cladding of a host component is useful. For example, various other engine environments, as well as different types of rotating or otherwise moving machinery will benefit from the features described herein. Thus, no particular feature or characteristic is constrained to an aircraft or a gas turbine engine, and the principles are equally embodied in other vehicles, or in other machinery or equipment, such as power generators or compressors, and in other applications.

As noted above, cladding as described herein may be employed in a variety of applications. By way of an exemplary embodiment as illustrated in FIG. 1, an engine 20 is configured as a gas turbine engine for aircraft propulsion. Although FIG. 1 depicts a turbofan engine in general, exemplary embodiments discussed herein may be employed in other applications. In some embodiments, the gas turbine engine 20 may form part of another unit, for example, an auxiliary power unit for an aircraft or a propulsion system for an aircraft. The gas turbine engine 20 has an overall construction and operation that is generally understood by persons skilled in the art. The gas turbine engine 20 may be disposed in an engine case 22 and may include a fan section 24, a compressor section 26, a combustor section 28, a turbine section 30, and an exhaust section 32. The fan section 24 may include a fan, which draws in and accelerates air. A fraction of the accelerated air from the fan section 24 is directed through a bypass section 34 to provide a forward thrust. The remaining fraction of air exhausted from the fan is directed into the compressor section 26.

The compressor section 26 may include a series of compressors that raise the pressure of the air directed into it from the fan section 24. The compressors may direct the compressed air into the combustor section 28. In the combustor section 28, the high pressure air is mixed with fuel and combusted. The combusted air is then directed into the turbine section 30. As described in further detail below, the turbine section 30 may include a series of rotor and stator assemblies disposed in axial flow series. The combusted air from the combustor section 28 expands through the rotor and stator assemblies and causes the rotor assemblies to rotate a main engine shaft for energy extraction. The air is then exhausted through a propulsion nozzle disposed in the exhaust section 32 to provide additional forward thrust.

Figure 2:
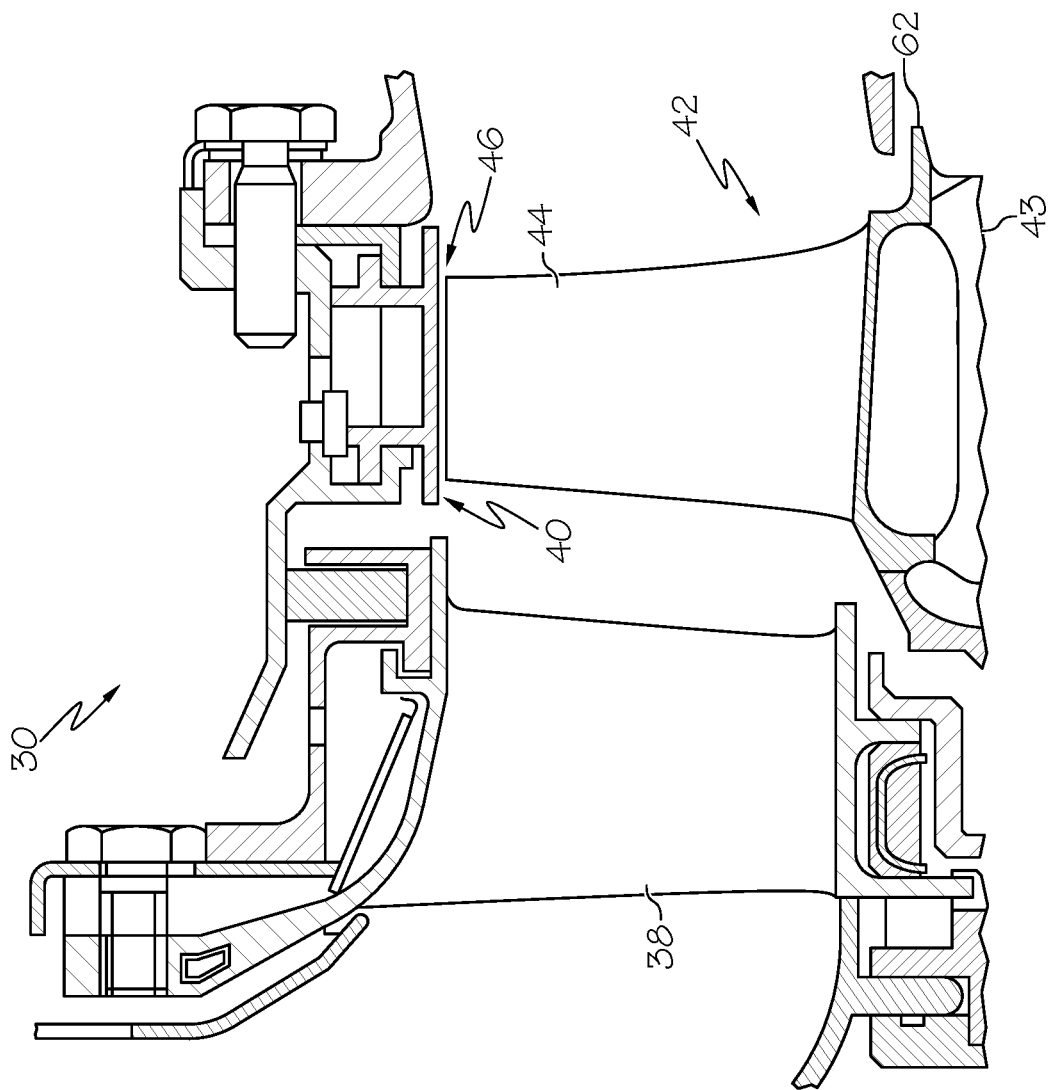
FIG. 2 is a partial, sectional elevation view of a portion of a turbine section of the gas turbine engine of FIG. 1, in accordance with an exemplary embodiment.

FIG. 2 is a partial, cross-sectional side view of a turbine section of an engine, such as the turbine section 30 of the gas turbine engine 20 of FIG. 1, in accordance with an exemplary embodiment. The turbine section 30 includes a turbine stator 38 and a turbine rotor 42 surrounded by a fixed structure 40 defining a gas flow path through which hot, combusted air from an upstream combustor section (e.g. combustor section 28 of FIG. 1) is directed. The cylindrically shaped fixed structure 40, which may be referred to as a shroud, is disposed concentric to the rotor 42 to optimize aerodynamic efficiency and forms a radial gap (i.e., blade running clearance) 46 with an outermost diameter of the rotor 42. The radial gap 46 is typically very small, for example, in a range of about 0.25 millimeter (mm) to about 0.50 mm. In other embodiments, the radial gap 46 may be larger or smaller than these ranges. Although only one turbine stator 38 and one turbine rotor 42 are shown, such stators 38 and rotors 42 are typically arranged in multiple alternating axially spaced, circumferential rows. As used herein, the term "axial" refers to a direction generally parallel to the engine centerline, while the term "radial" refers to a direction generally perpendicular to the engine centerline.

The rotor 42 generally includes rotor blades 44 (one of which is shown in FIG. 2) with a platform 62 for mounting on a rotor disk 43, which in turn is coupled to the engine shaft. The turbine stator 38 directs the air toward the turbine rotor 42. The air then impinges upon the rotor blades 44 of the turbine rotor 42, thereby driving the turbine rotor 42 for power extraction. To allow the turbine section 30 to operate at desirable elevated temperatures, certain components are cooled.

Figure 3:
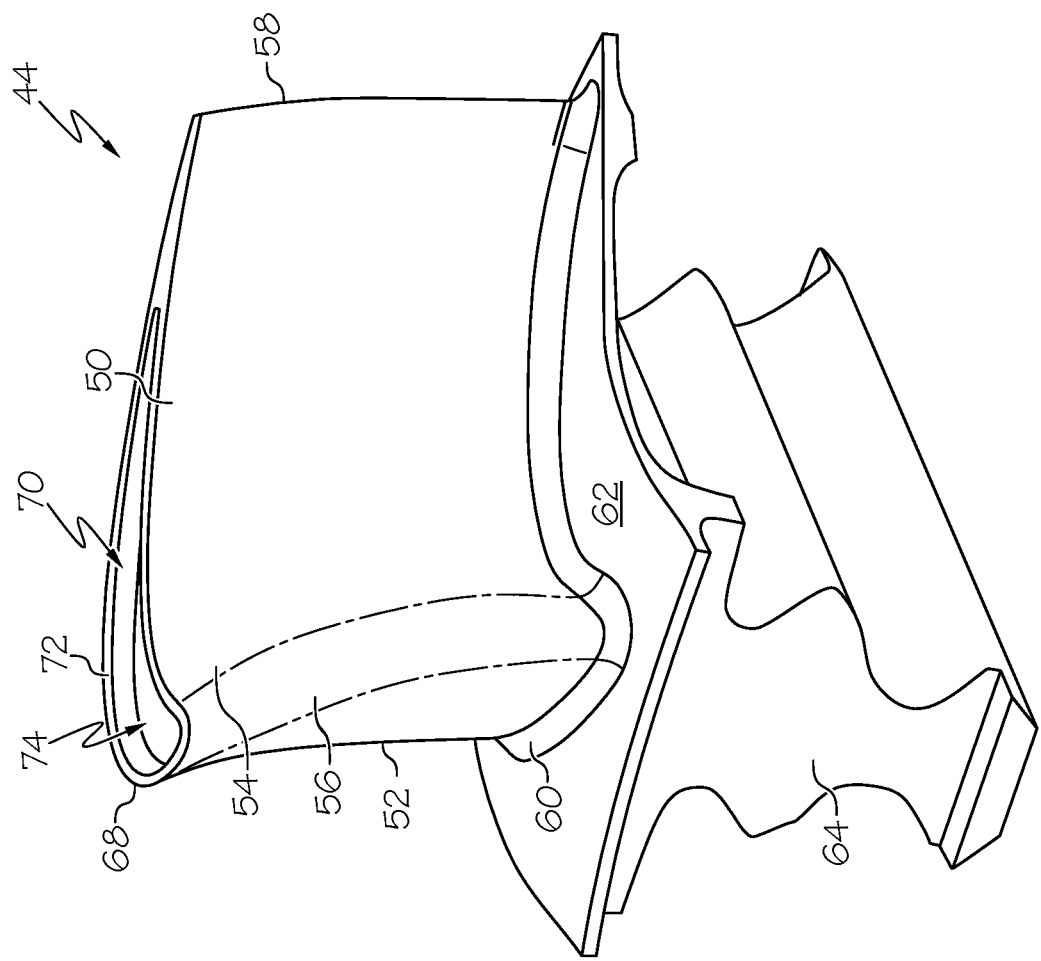
FIG. 3 is an isometric view of a turbine rotor blade of the turbine section of FIG. 1, in accordance with an exemplary embodiment.

Referring additionally to FIG. 3, illustrated is an exemplary aircraft jet engine turbine rotor blade, such as rotor blade 44 of FIG. 2, removed from the turbine section 30. FIG. 3 depicts one exemplary embodiment, and other exemplary embodiments may have alternate configurations or arrangements. For example, the tip of the blade 44 is formed with a parapet 72 type wall that projects around the tip's perimeter and in the shape of an airfoil 50, but in other embodiments, the host component may not be a tip, or may be in other shapes and may take other forms. The blade 44 includes the airfoil 50, a platform 62 and a root 64. The platform 62 is configured to radially contain turbine airflow within a shroud (e.g., fixed structure 40 of FIG. 2). The root 64 extends from the underside of the platform 62 and is configured to couple the rotor blade 44 to a turbine rotor disk 43. In this manner, a circumferential ring of blades 44 may be formed about the rotor disk 43 for rotation. In general, the rotor blade 44 may be made from any suitable material, including high heat and high stress resistant alloys/superalloys, such as nickel based alloys, Rene 88, Mar-M-247, single crystal materials, steels, titanium alloys or the like.

The airfoil 50 projects radially outwardly from the platform 62. The airfoil 50 has two side (or outer) walls 52, 54, each having outer surfaces that together define an airfoil shape. The first side wall 52 defines a suction side with a generally convex shape, and the second side wall 54 defines a pressure side with a generally concave shape. In a chordwise direction, the airfoil side walls 52, 54 are joined at a leading edge 56 and trailing edge 58. As used herein, the term "chordwise" refers to a generally longitudinal dimension along the airfoil from leading edge to trailing edge, typically curved for air flow characteristics. In an axial direction, the airfoil side walls 52, 54 extend from a base 60 at the platform 62 to an end/blade tip 68. In general, the tip 68 is positioned to rotate in close proximity to the fixed structure 40 (FIG. 2) in order to maximize energy extraction, as disclosed above.

As shown in FIG. 3, the tip 68 includes a feature 70, which includes the parapet 72, which is in the form of a wall that extends around the tip 68 following the airfoil side walls 52, 54, and projects radially outward leaving a void 74 in its center. In other embodiments, the feature 70 may take other forms different than the parapet 72 and may have a different shape, such as covering the entire end of the blade 44. For purposes of the present disclosure, the parapet 72 is a feature that is built up on blade 44, which is initially formed with a plain end 76 as illustrated in FIG. 4A, or on a prepared end 77 as illustrated in FIG. 4B in the area of the tip 68 prior to addition of the built up parapet 72. Referring to the tip 68, generally means the tip of the blade 44 as clad, and referring to the end means the plain end 76 or the prepared end 77 prior to cladding, although they may be interchangeable and the tip area generally includes both the cladding and the plain end 76/prepared end 77. The prepared end 77 may be created with a partial parapet wall 81 having a height 79 of 0.005 inches. The partial parapet wall 81 may be created when the blade 44 is fabricated, or when the blade 44 is being repaired, such as through grinding or other machining. In the latter case, the partial parapet wall is a remnant of the full wall that may have been worn or damaged. The prepared end 77 with a partial parapet wall 81 may help ensure full fusion of newly added tip material and serves as a guide for the shroud components when located as described below.

Figure 5:
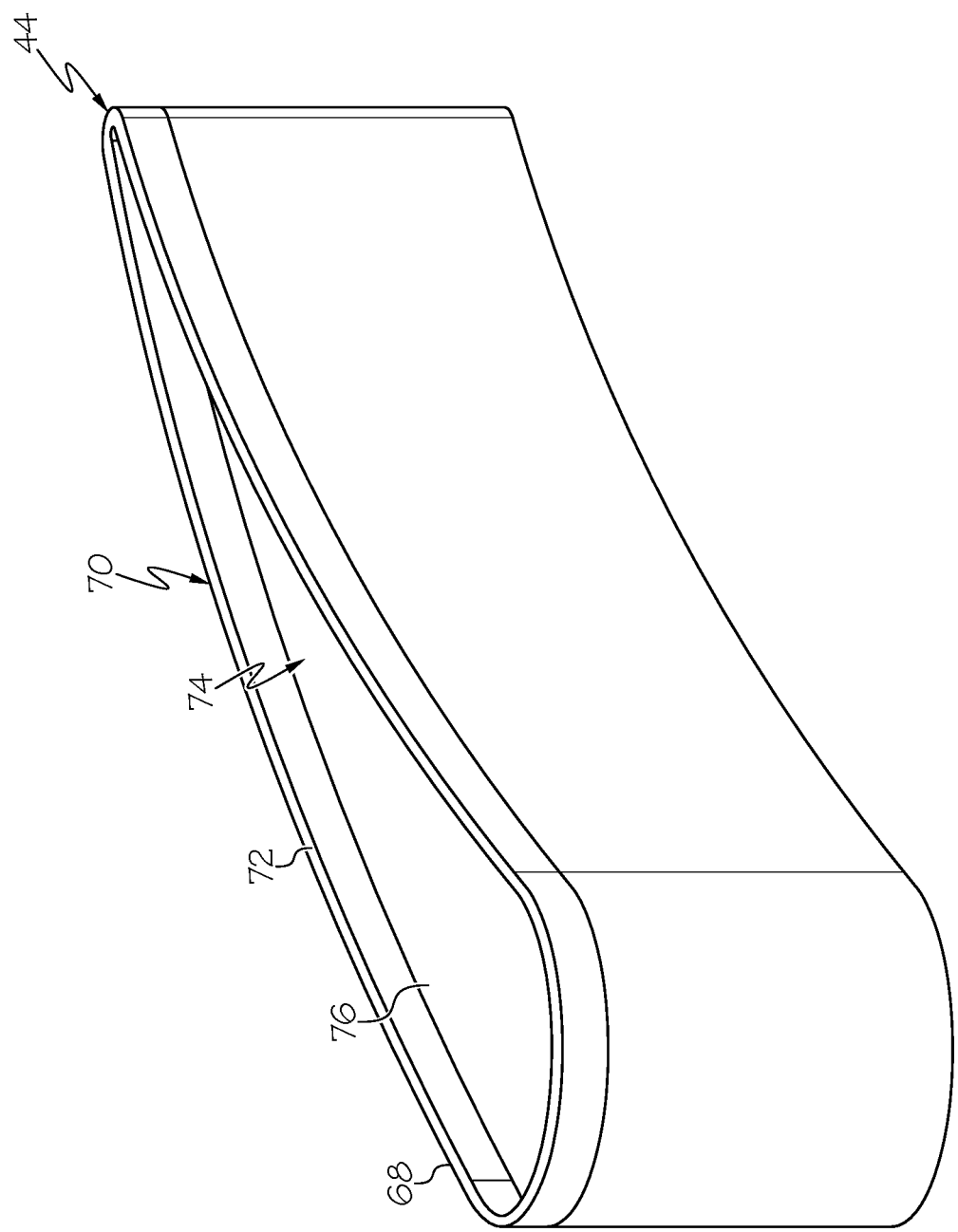
FIG. 5 is a schematic illustration of the blade tip area of FIG. 4A with a parapet wall added to the end of the blade, in accordance with an exemplary embodiment.

In the current example, FIG. 5 shows the blade 44 is formed, such as by casting or other known metal processing techniques, in a substantially complete shape with the plain end 76 prepared for addition of the feature 70 per design requirements. The feature 70, in this example including the parapet 72, is added to the plain end 76 such as by laser cladding. In laser cladding material is selectively added to the host component, in this example the plain end 76, to form the feature 70. A focused laser is digitally controlled to move across the select location for cladding of the plain end 76, and a selected alloy powder is fed into the beam building up the feature 70 as deposited material. The material applied by laser cladding may be the same or similar to that from which the remainder of the blade 44 is made, or may be a different material. In this example, laser cladding is employed to impart different mechanical properties to the tip 68 of the blade 44. For example, the tip 68 is formed of a material that has a greater strength than the material of the remainder of the blade 44 by cladding the feature 70 such as from a high heat and high stress resistant alloy/superalloy as described above, but alloyed to have superior properties. Typically, post laser cladding machining and processing is required to bring the feature 70 to its desired net-shape. However as further described below in the current disclosure, the need for post processing machining to remove excess laser cladded material, such as by cutting/grinding material removal operations, is eliminated or nearly eliminated.

Figure 6:
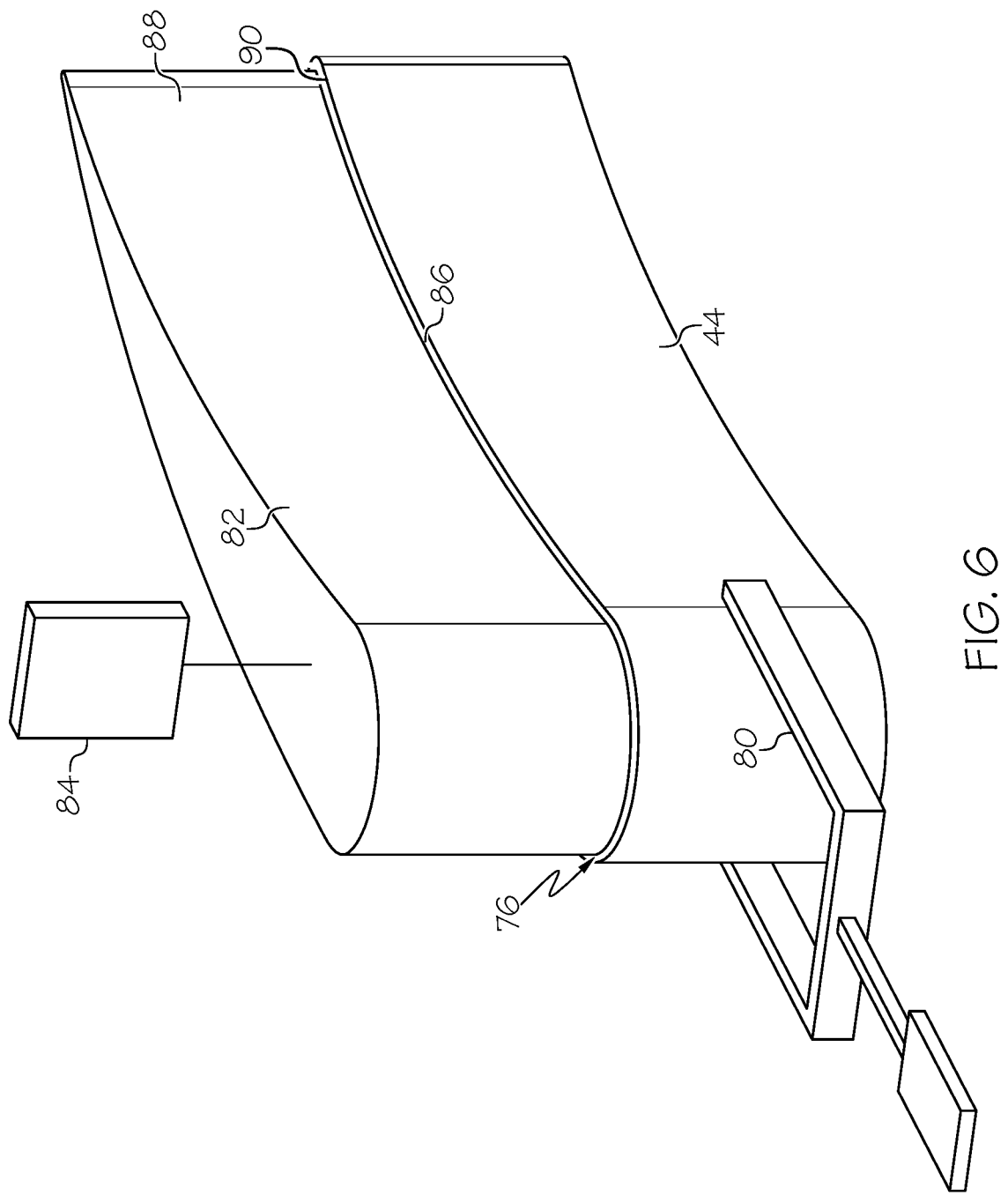
FIG. 6 is a schematic illustration of the blade tip area of FIG. 4A secured in a fixture with a shroud component positioned against the end of the blade, in accordance with an exemplary embodiment.
Figure 7:
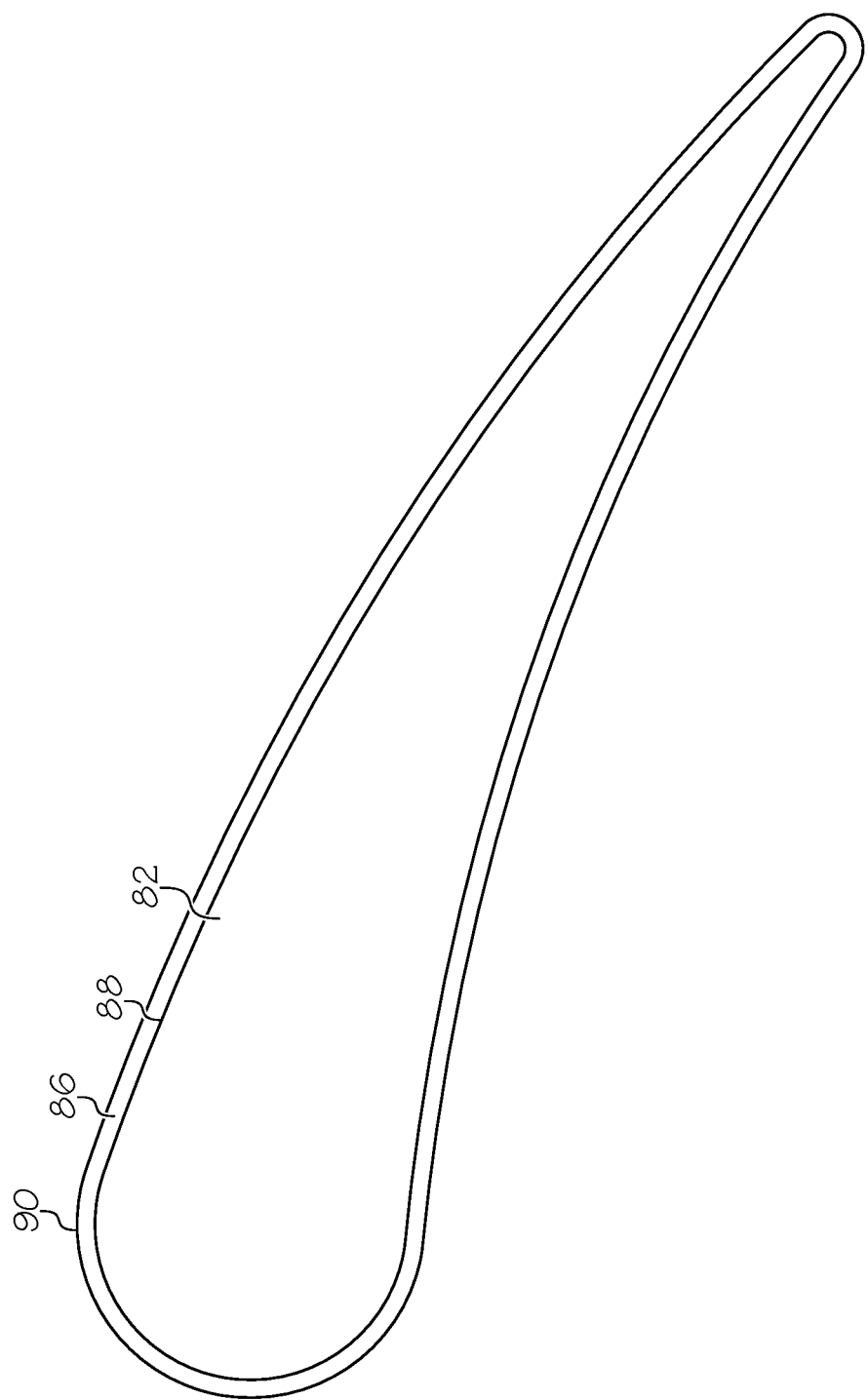
FIG. 7 is a schematic end view of the blade tip area of FIG. 6, in accordance with an exemplary embodiment.
Figure 8:
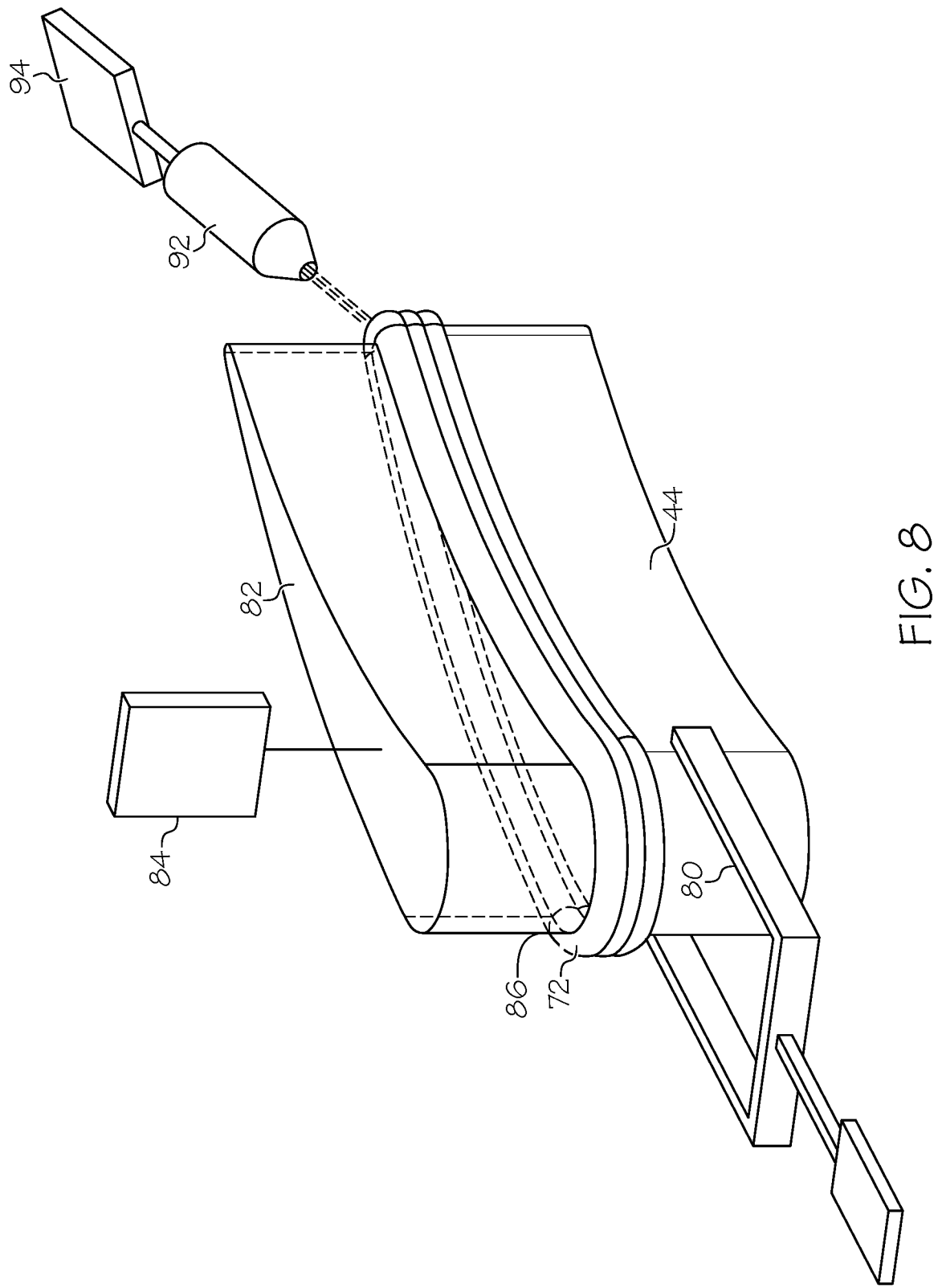
FIG. 8 is a schematic illustration of the blade tip area of FIG. 6 with the parapet wall being added by cladding, in accordance with an exemplary embodiment.
Figure 9:
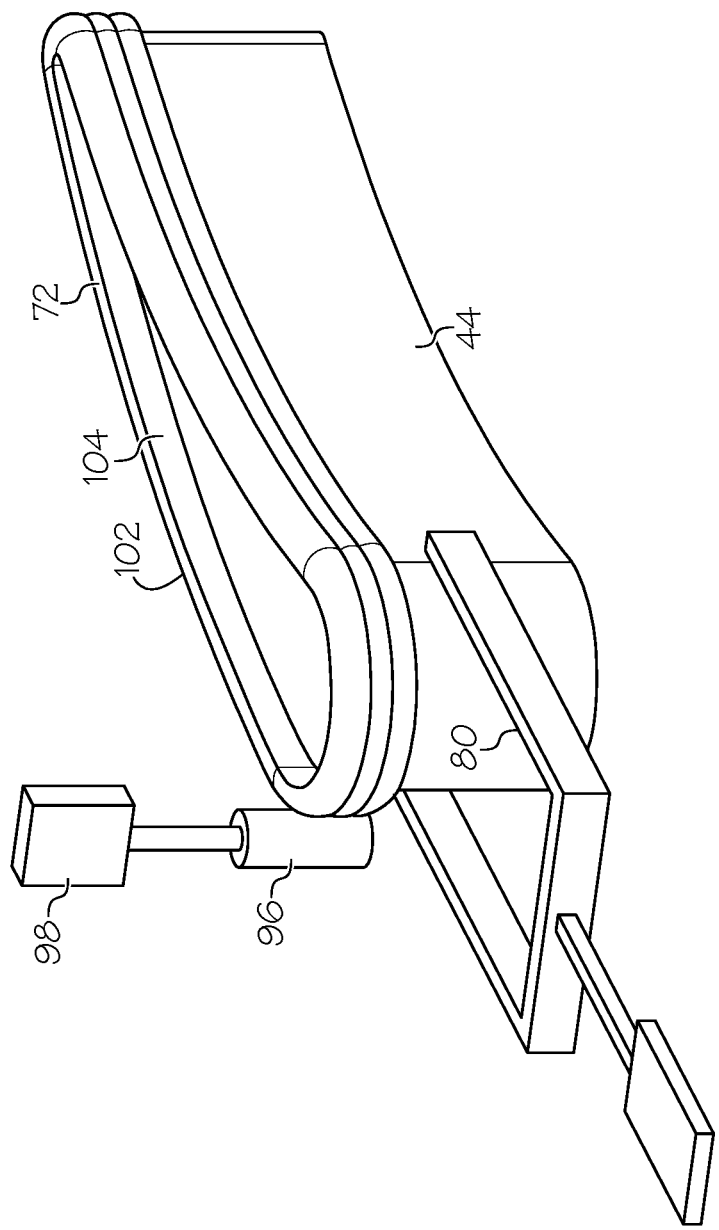
FIG. 9 is a schematic illustration of the blade tip area of FIG. 6 with the parapet wall being touched-up, in accordance with an exemplary embodiment.

Referring to FIG. 6, net formation of aspects of the feature 70 as the parapet 72 will be described. The blade 44 is mounted in a fixture 80, such as by clamping, to prepare for cladding operations. A shroud, which in this example is a cladding containment tool in the form of a shroud component 82, is then positioned against the plain end 76 by an actuation system 84. For example, the actuation system 84 may include one or more cylinders or motors or other actuators connected and controlled to provide mobility to the shroud component 82. The shroud component 82 is an insert type structure in-that it is inserted against the blade 44 and the cladding is added around the shroud component 82. The shroud component 82 has a profile mimicking that of the airfoil 50 shape of the blade 44, such as being similar except for a slightly size difference. As a result, when the shroud component 82 is positioned against the plain end 76, a gap 86 is defined between the outer perimeter 88 of the shroud component 82 and the edge 90 as also illustrated in FIG. 7. The gap 86 extends completely around the shroud component 82 in this example and is sized to match the design dimensions for the width of the parapet 72. As such, the shroud component 82 defines the net shape of the internal side of the parapet 72 so that when cladding is added, it contains the cladding and when removed provides the net shape. For example with reference to FIG. 8, a laser cladding tool 92 is guided around the shroud component 82 by an actuation system 94, while simultaneously material is deposited to fill the gap 86, building up the parapet 72. As shown in FIG. 9, after the actuation system 84 retracts the shroud component 82, a cutting tool 96 is guided by an actuation system 98 to machine the outer perimeter 102 of the parapet 72 to its net dimensions. The inner perimeter 104 does not require further processing as the use of the shroud component 82 resulted in definition of the inner perimeter 104 at its net shape. In some embodiments slight touch-up of the inner perimeter 104 may be needed, depending on the shape of the design and the ability to replicate it using the shroud component 82 as an insert to delimit application of cladding material. However, the touch-up post cladding processing is simplified in-that it only requires sanding or polishing rather than cutting. Due to the hardness of the parapet 72, manufacturing efficiency is significantly improved.

Figure 10:
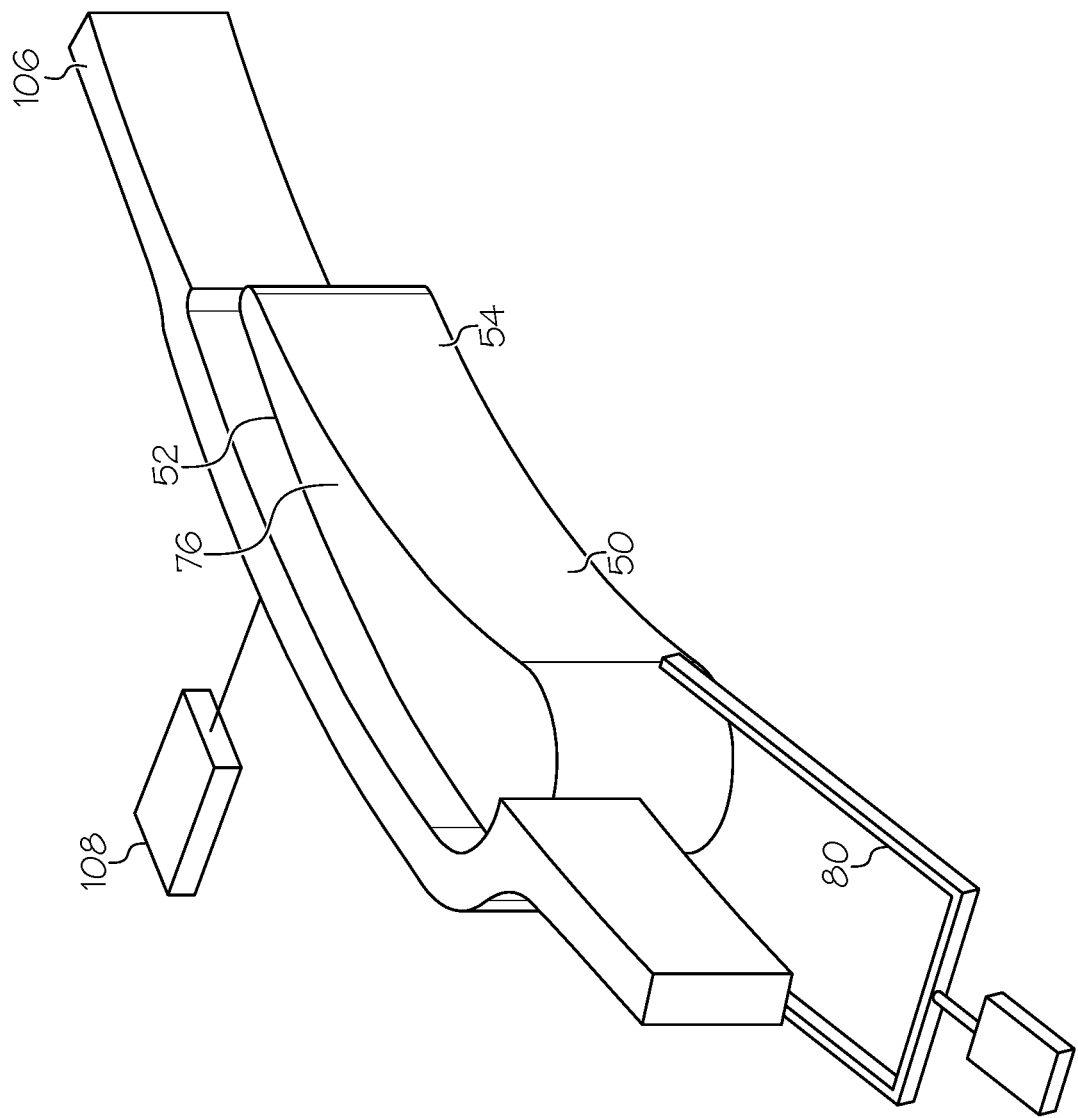
FIG. 10 is a schematic illustration of the blade tip area of FIG. 4A secured in a fixture with shroud components positioned against the end area, in accordance with an exemplary embodiment.

Referring to FIG. 10, net formation of additional aspects of the parapet 72 will be described. Again the blade 44 is mounted in the fixture 80, such as by clamping, to prepare for cladding operations. A shroud, which in this example includes a shroud component 106 is then positioned by an actuation system 108 against the blade 44 around its outer perimeter on the suction side defined by the side wall 52. The shroud component 106 extends partly around and extends beyond the plain end 76. The shroud component 106 is a shell type structure with a profile mimicking that of the airfoil 50 shape of the blade 44 so that the shroud component 106 fits against the side wall 52 and extends beyond the plain end 76.

Figure 11:
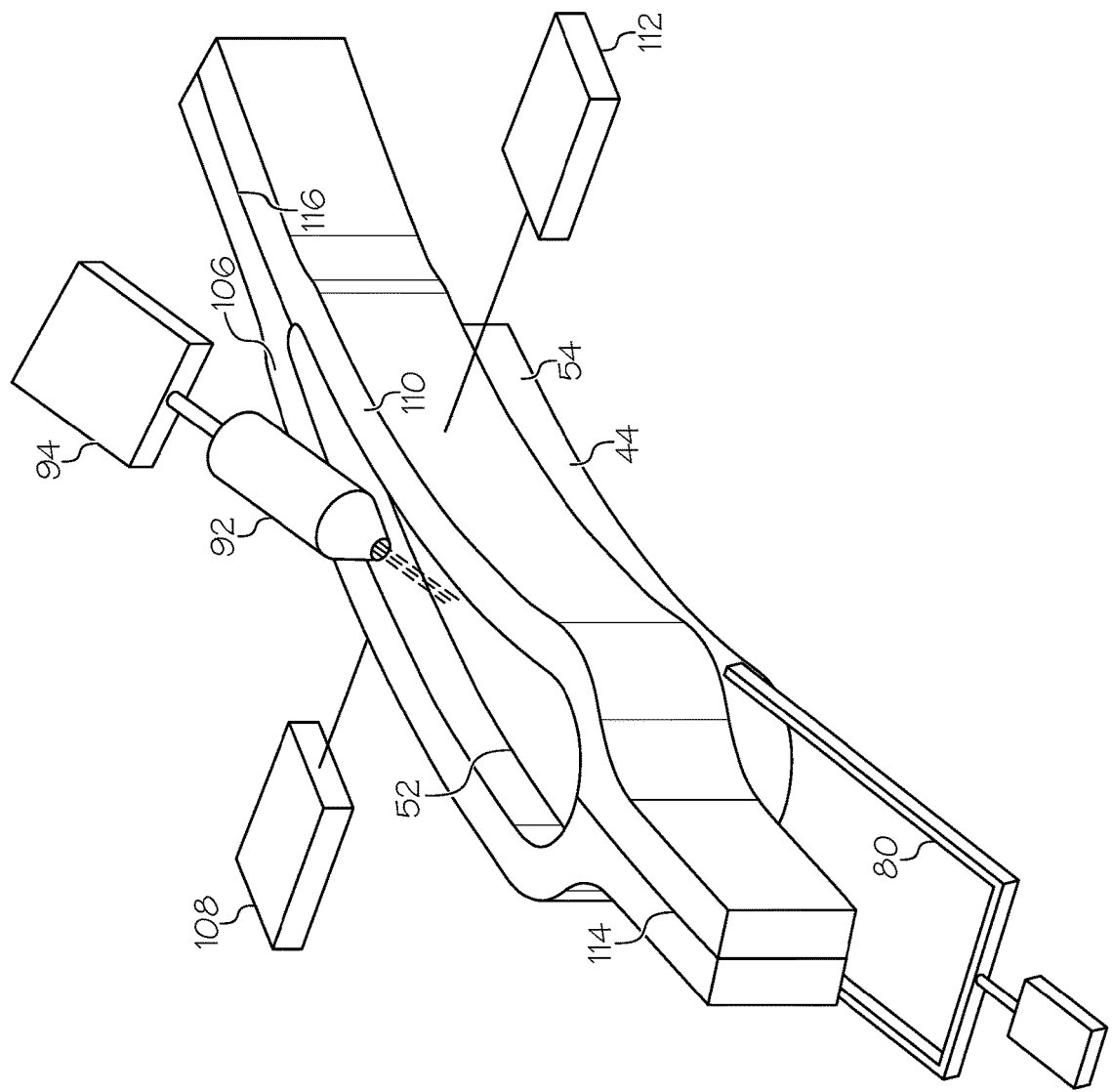
FIG. 11 is a schematic illustration of the blade tip area of FIG. 10 with the parapet wall being added by cladding, in accordance with an exemplary embodiment.

As shown in FIG. 11, the shroud includes another shroud component 110 positioned by an actuation system 112 against the blade 44 around its outer perimeter on the pressure side defined by the side wall 54. In other embodiments, the shroud components 106, 110 may be made as one piece. In this embodiment, the shroud component 106 extends partly around and extends beyond the plain end 76. The shroud component 110 is also a shell type structure with a profile mimicking with the same profile, that of the airfoil 50 shape of the blade 44, such as being similar except for a slight size difference, so that the shroud component 106 fits against the side wall 52 and extends beyond the plain end 76. The shroud components 106, 110 mate together at ends 114, 116 to completely surround the tip area of the blade 44 fitting against the entire outer perimeter of the blade 44 as defined by the side walls 52, 54 and extending beyond the plain end 76. The laser cladding tool 92 is guided around the inside of the shroud components 106, 110 by the actuation system 94, depositing material onto the plain end and building up the parapet 72.

Figure 12:
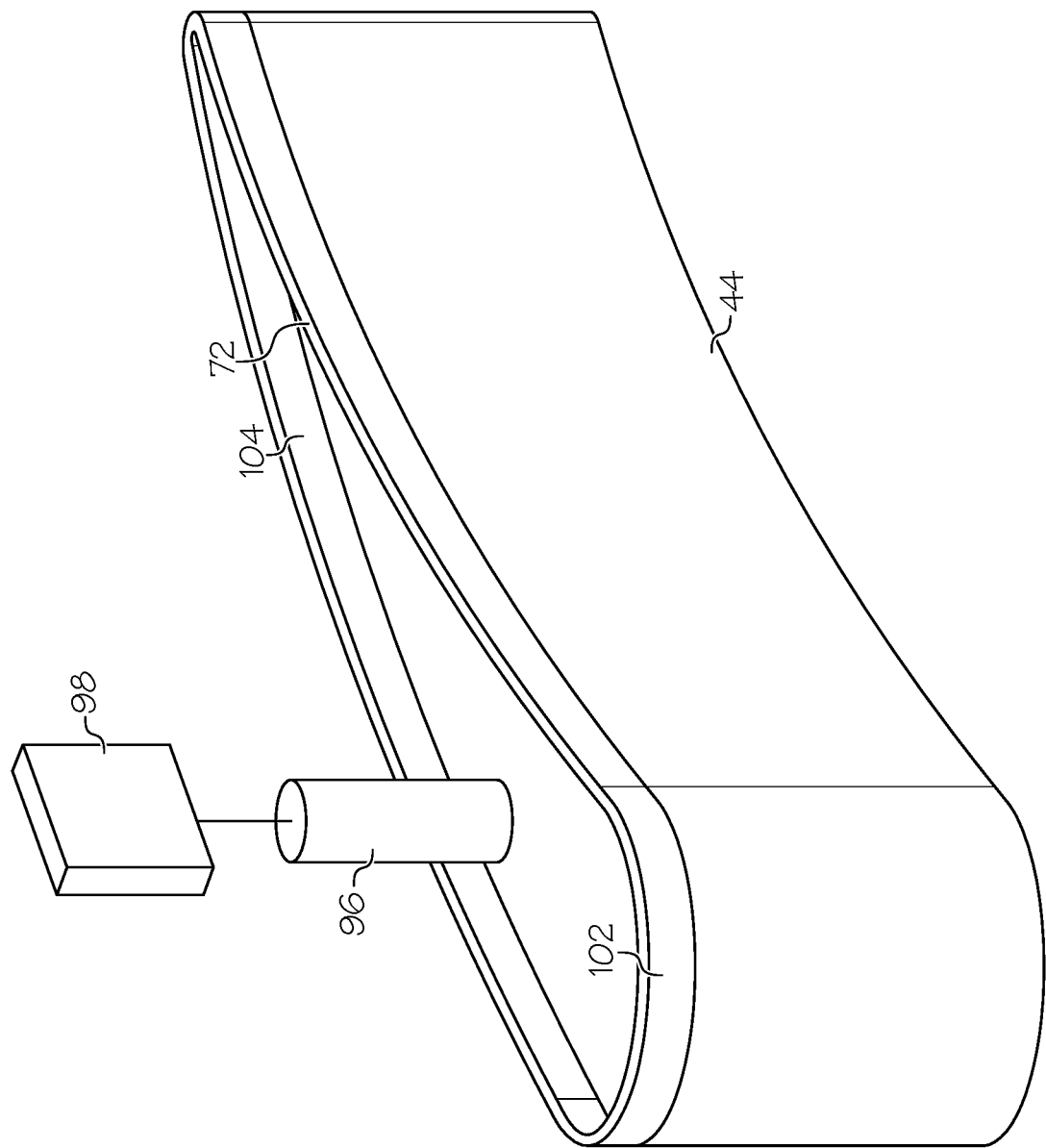
FIG. 12 is a schematic illustration of the blade tip area of FIG. 10 with the parapet wall being touched-up, in accordance with an exemplary embodiment.

As shown in FIG. 12, after the actuation systems 108, 112 are used to retract the shroud components 106, 110, the cutting tool 96 is guided by the actuation system 98 to machine the inner perimeter 104 of the parapet 72 to its net dimensions. The outer perimeter 102 does not require further processing as the use of the shroud components 106, 110 resulted in definition of the outer perimeter 102 at its net shape. In some embodiments, slight touch-up of the outer perimeter 102 may be needed, depending on the shape of the design and the ability to replicate it using the shroud components 106, 110 as a shell to delimit application of cladding material. Also for example, some touch-up may be needed at the parting lines of the shroud components 106, 110.

Figure 13:
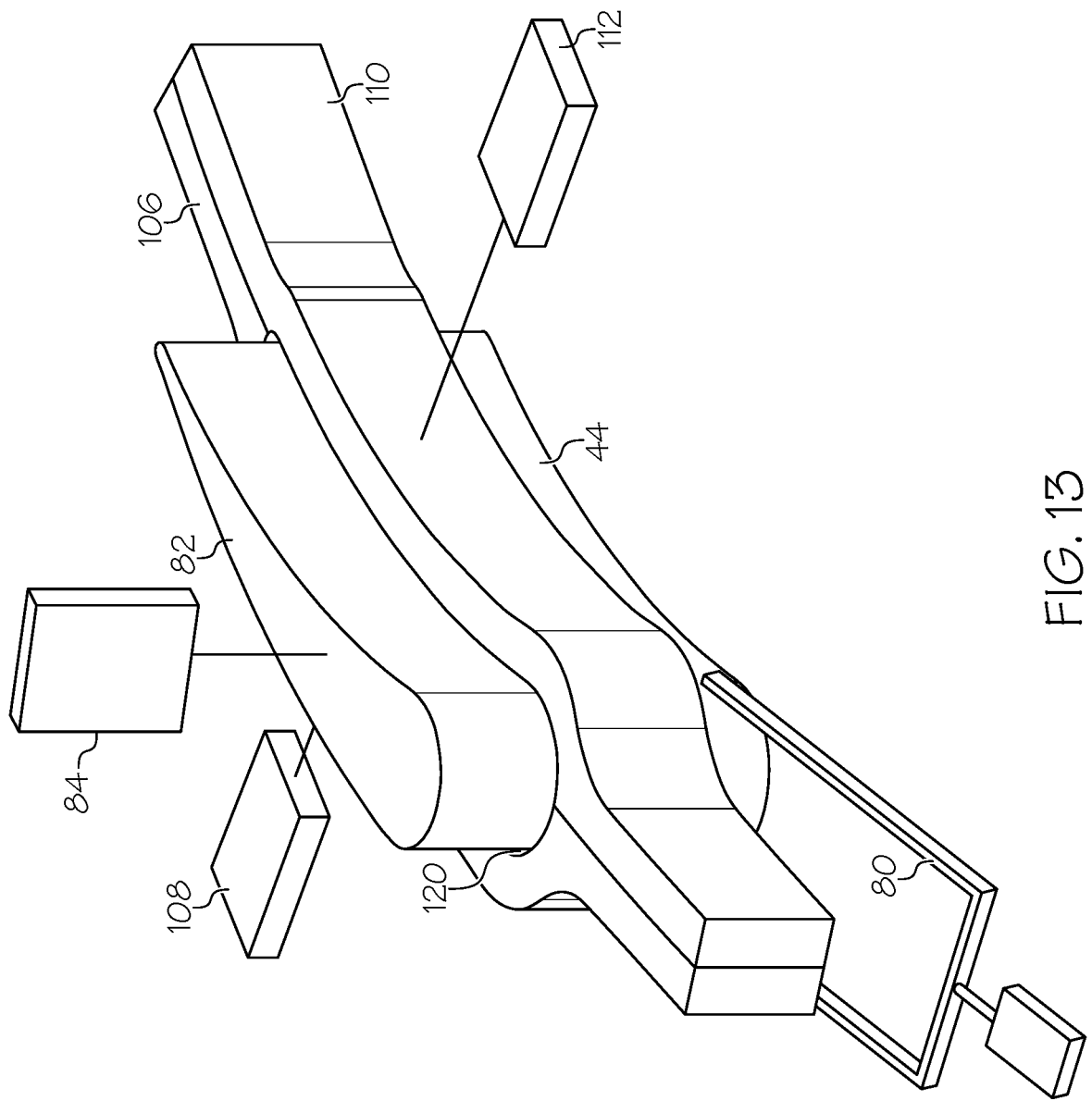
FIG. 13 is a schematic illustration of the blade tip area of FIG. 4A secured in a fixture with multiple shroud components positioned against the end area, in accordance with an exemplary embodiment.
Figure 14:
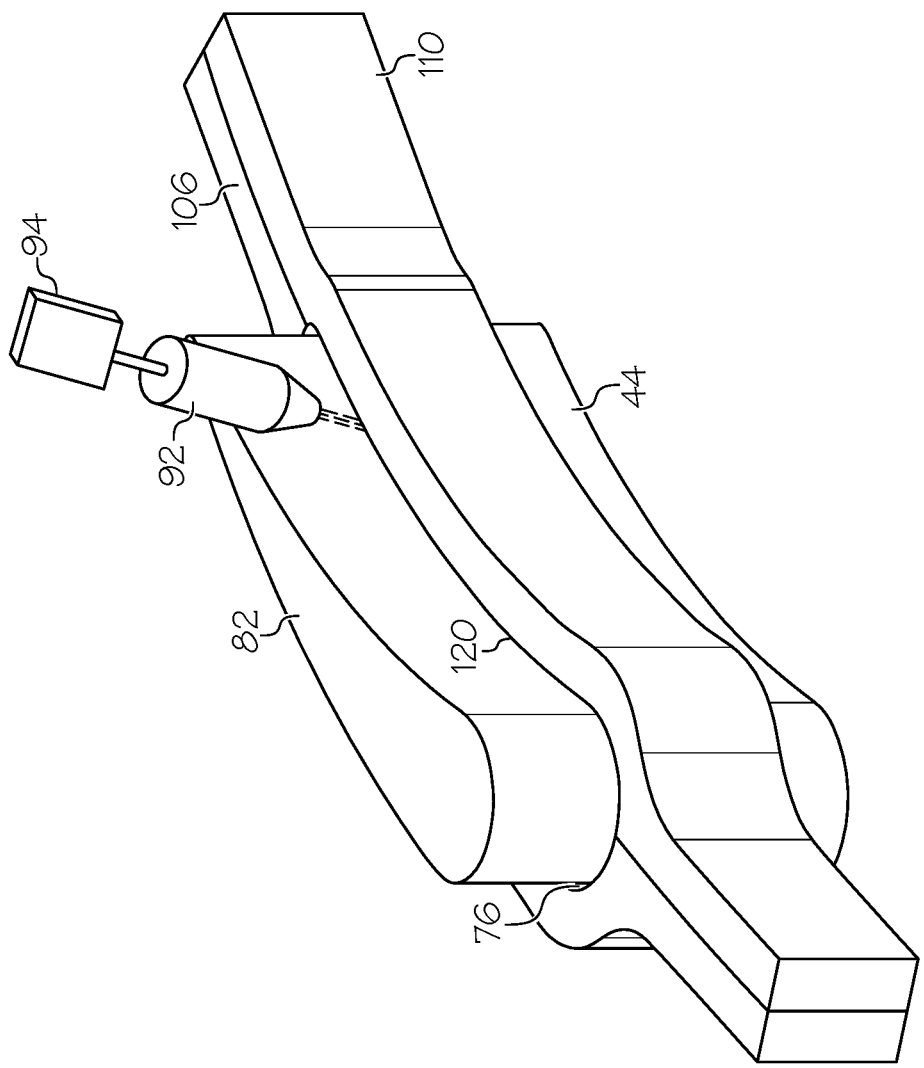
FIG. 14 is a schematic illustration of the blade tip area of FIG. 13 with the parapet wall being added by cladding, in accordance with an exemplary embodiment.
Figure 15:
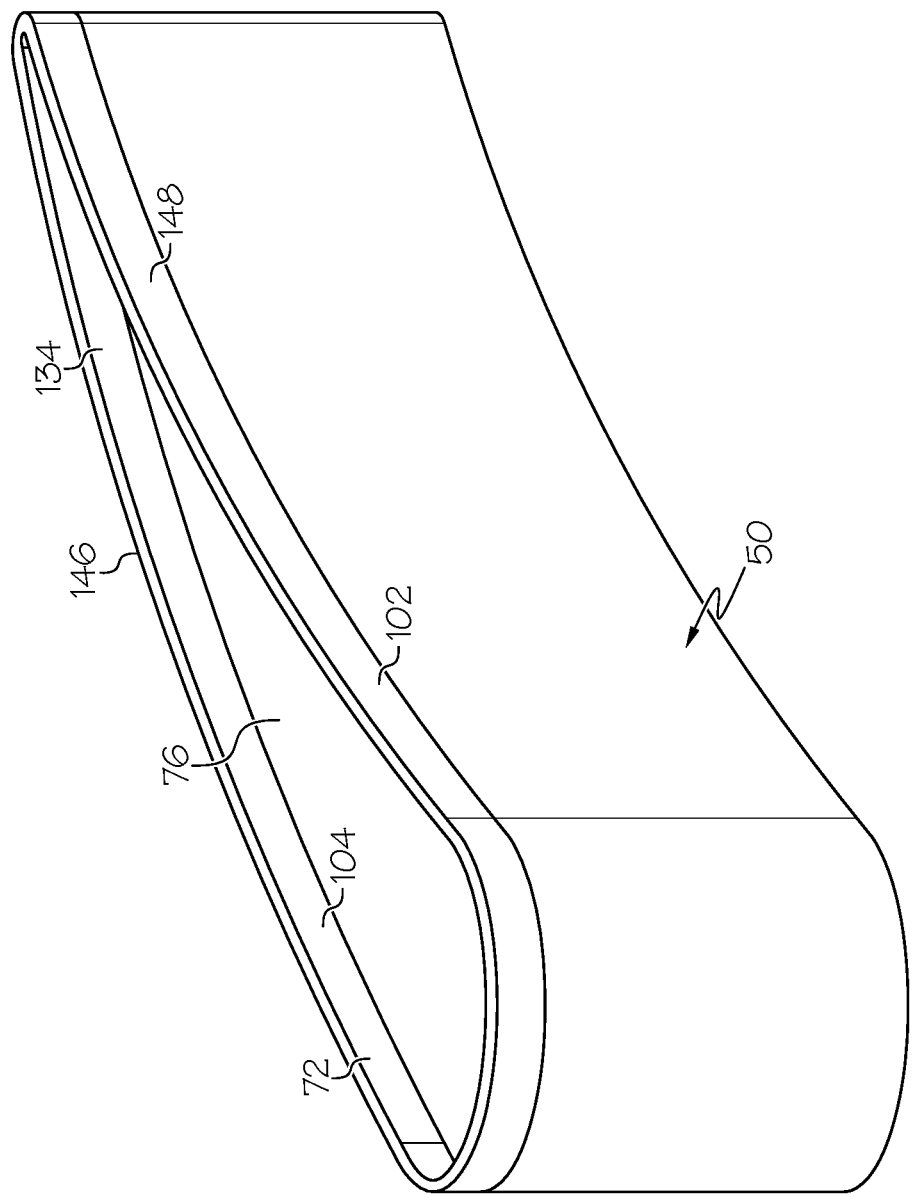
FIG. 15 is a schematic illustration of the blade tip area of FIG. 13 with the parapet wall completed, in accordance with an exemplary embodiment.

Referring to FIG. 13, use of the shroud components 82, 106 and 110 together is illustrated to define a net or near-net shape of the parapet 72 during laser cladding on both the outer and inner perimeters 102, 104. The blade 44 is mounted in the fixture 80. In this example, the shroud includes the shroud components 82, 106 and 110 positioned against the blade 44 to contain cladding material when added. A gap 120 is defined between the shroud component 82 on the inside and the shroud components 106, 110 on the outside. As shown in FIG. 14, the laser cladding tool 92 is guided around the gap 120 by the actuation system 94, and simultaneously material is deposited onto the plain end 76, building up the parapet 72. As shown in FIG. 15, after the actuation systems 84, 108, 112 are used to retract the shroud components 82, 106, 110, the parapet 72 is formed in net-shape with the outer and inner perimeters 102, 104 defined by the shroud of the shroud components 82, 106 and 110. In some examples, slight touch-up of the feature 70 may be needed, such as to ensure the parapet 72 closely matches the profile of the airfoil 50, such as at the parting lines of the shroud components 106, 110.

Figure 16:
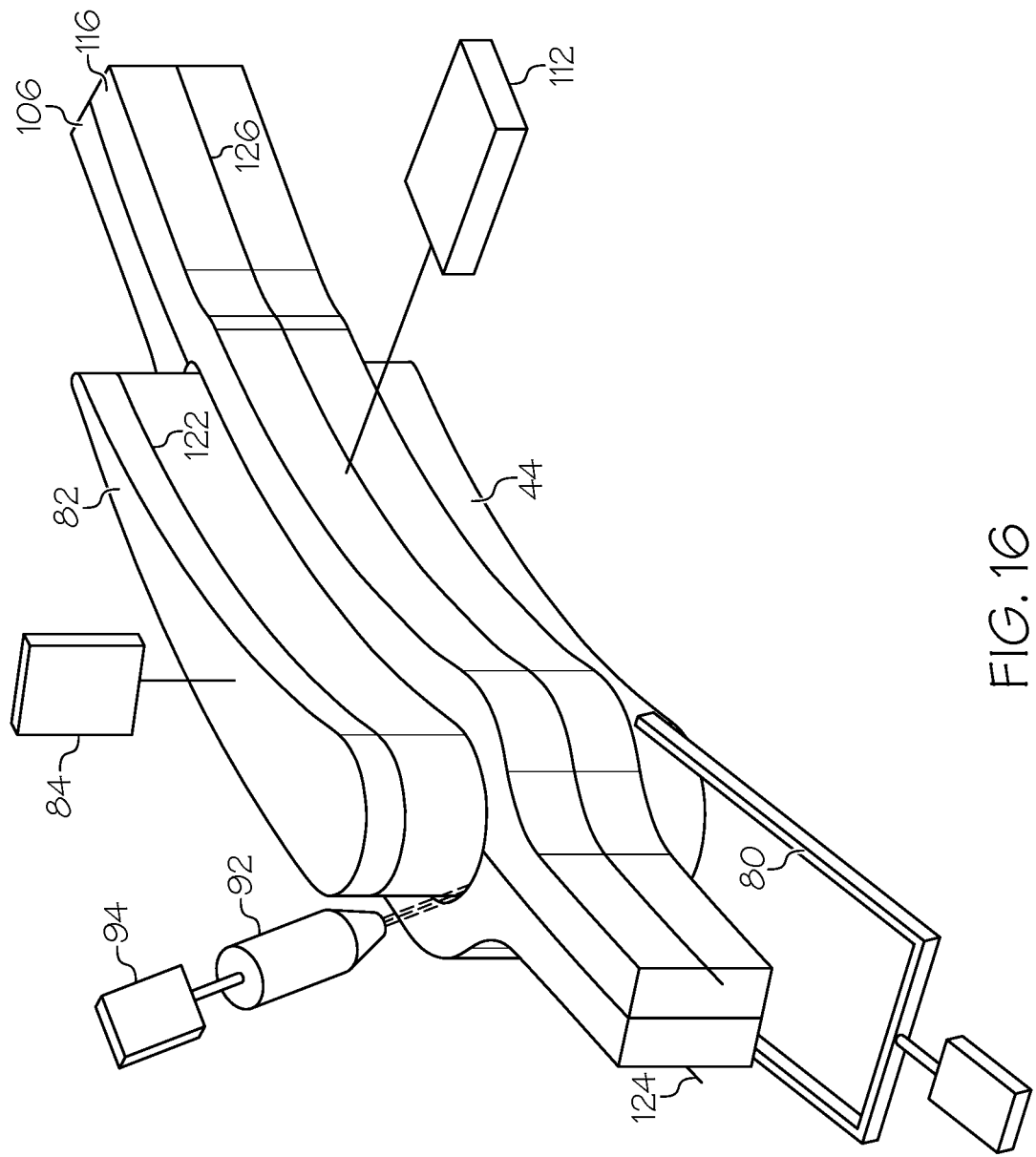
FIG. 16 is a schematic illustration of the blade tip area of FIG. 4A secured in a fixture with multiple shroud components positioned against the end area that have heating elements, in accordance with an exemplary embodiment.

As shown in FIG. 16, the shroud components 82, 106, 110 include heating elements 122, 124, 126, respectively. The heating elements 122, 124, 126 are supplied with current during the application of cladding to the blade 44. Thermal control via the heating elements 122, 124, 126 in the shroud formed by the shroud components 82, 106, 110 slows cool-down of the applied cladding material forming the parapet 72. To slow cooling, the shroud components 82, 106, 110 are held in place for a period of time following application of the cladding material. Heat is generated by the heating elements 122, 124, 126 during application of the cladding and during the cool-down period. Slower cooling reduces the possibility of defects such as cracks forming in the applied cladding material or its interface with the base material of the blade 44.

Figure 17:
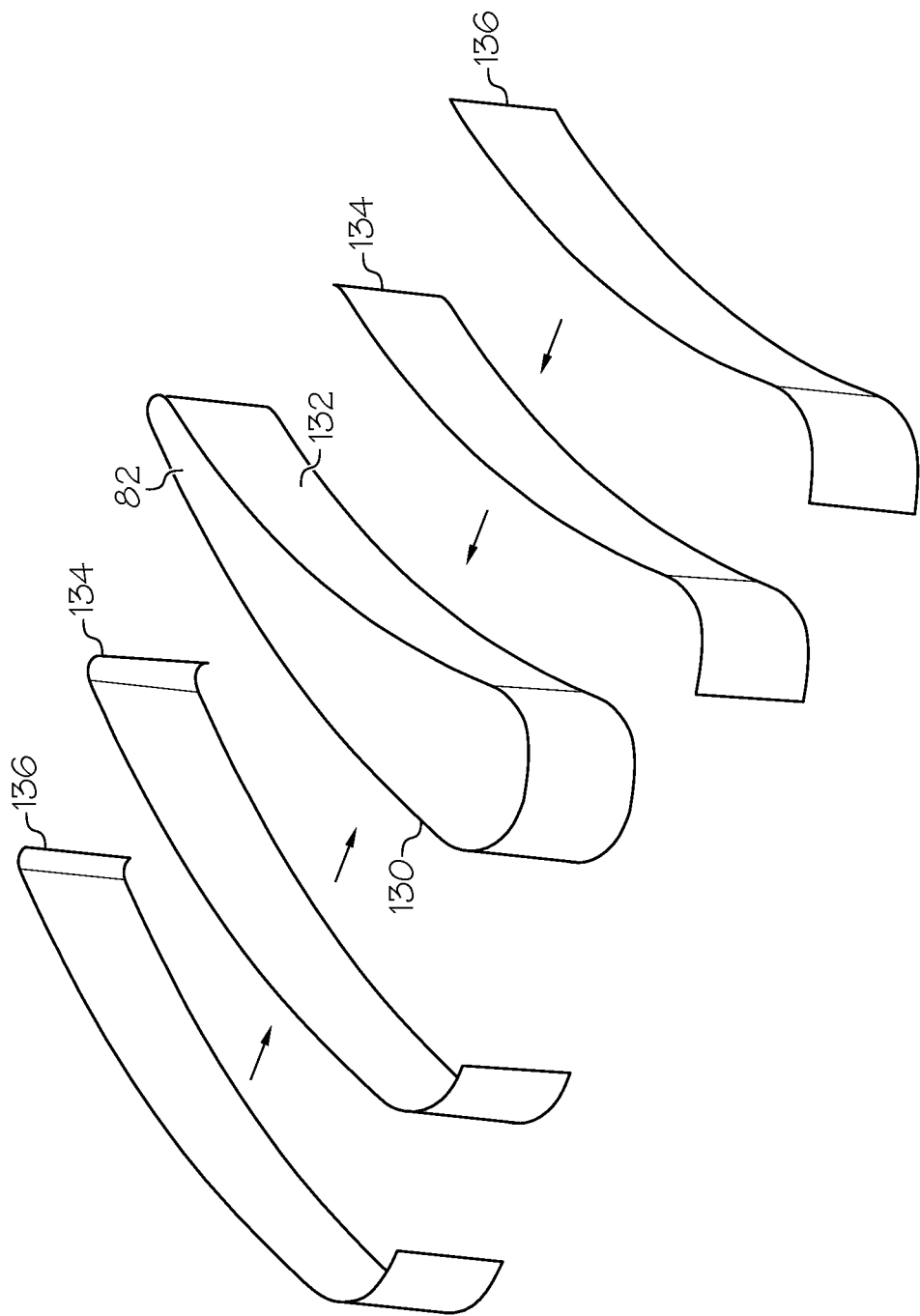
FIG. 17 is a schematic exploded illustration of a ceramic element of FIG. 13, for processing in accordance with an exemplary embodiment.
Figure 18:
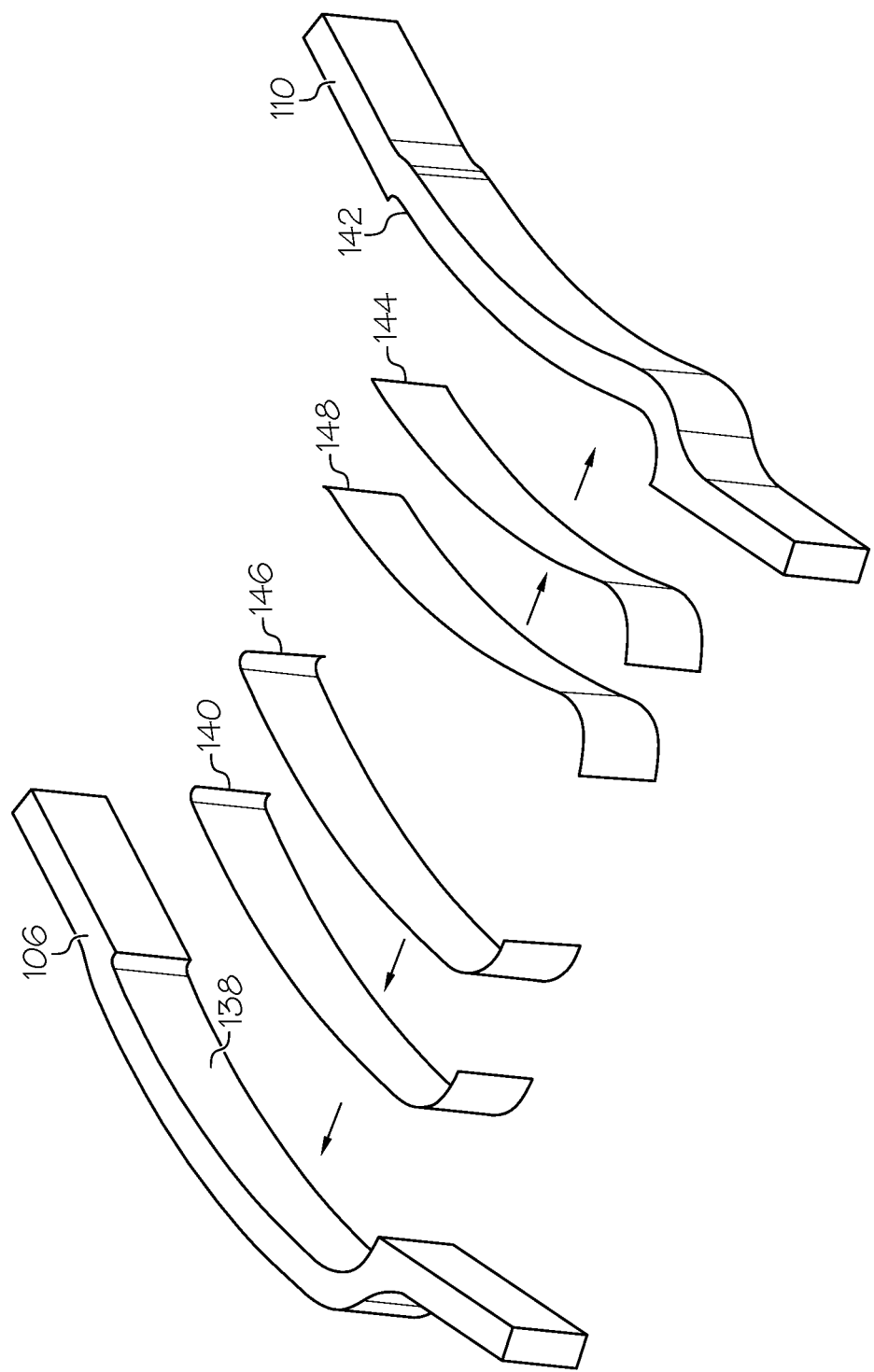
FIG. 18 is a schematic exploded illustration of ceramic elements of FIG. 13, processed in accordance with an exemplary embodiment.

Being in the path of hot gases in the engine 20, the blades 44 are subjected to elevated temperatures along with corrosive and errosive conditions. Therefore, in a number of applications the surfaces of the blades 44 receive a protective coating to prevent or inhibit degradation. In this embodiment, the protective coating is an aluminide or precious metal (platinum) aluminide that may be applied by diffusion, overlay, or other means. To be compatible with the surfaces of the airfoil 50, the surface chemistry (microstructure and properties) of the features 70 receive a protective coating of the same material e.g. platinum aluminide. In the current embodiment, the application occurs concurrent with the cladding operation. Referring to FIG. 17, prior to application to the blade 44, the shroud component 82 is coated on sides 130, 132 by a layer 134 of a release agent. For example, the release agent may be amenable to high temperatures and may include a material that is graphite based, boron nitride based, silicone based or as is otherwise known and available. The release agent layer 134 extends completely around the shroud component 82. Following application of the release agent layer 134, the shroud component 82 with the release agent layer 134 is coated with a layer 136 of protective coating, in this example platinum aluminide. Similarly, as shown in FIG. 18, the shroud component 106 is coated on its side 138 with a release agent layer 140, and the shroud component 110 is coated on its side 142 with a release agent layer 144. A layer 146 of platinum aluminide is added to the shroud component 106 onto the release agent layer 140 and a layer 148 of platinum aluminide is added to the shroud component 110 onto the release agent layer 144. It should be appreciated that other release agents and protective coating materials may be used. The layers may be added prior to the processing as described in relation to FIG. 14. During the laser cladding as described, the platinum aluminide layers 136, 146, 148 are fused to the parapet 72 as shown in FIG. 15, and extend over the junction between the parapet 72 and the remainder of the blade 44 for a continuous coating. The fusing occurs as the parapet is built by laser cladding deposition. The release agent layers 134, 140, 144 ensure that the platinum aluminide does not stick to the shroud components 82, 106, 110. In this embodiment, the shroud components 82, 106, 110 are made of ceramic material, and in other embodiments may be made of another hard, high temperature material.

Figure 19:
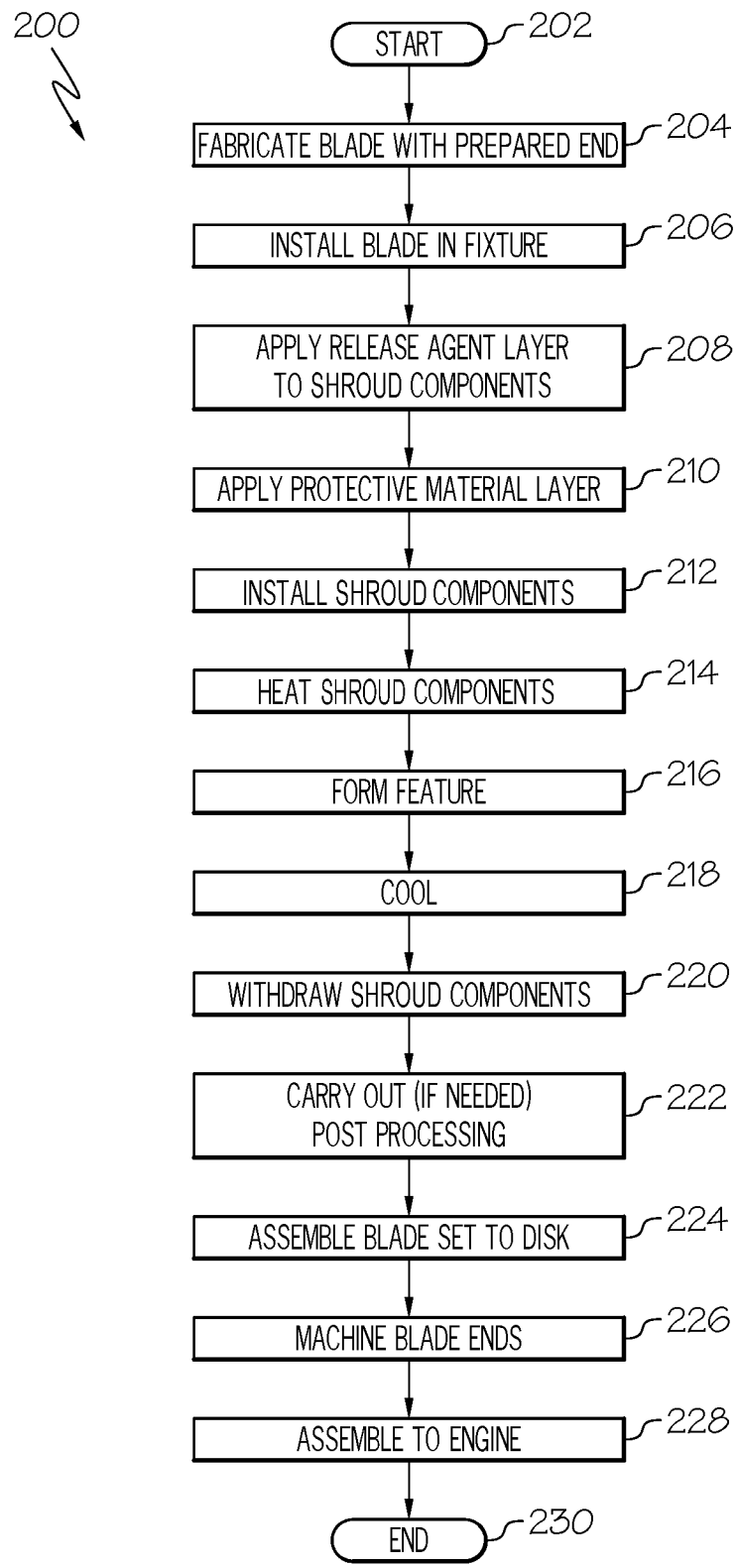
FIG. 19 is a process of cladding end of the blade of FIG. 13, in accordance with an exemplary embodiment.

Referring to FIG. 19, the process 200 of laser cladding the tip area of the blade 44 for the rotor of the turbine section 30 of the engine 20 using net-shaped shrouds is illustrated in flow chart form. The process 200 begins 202 and the blade 44 is fabricated 204. The blade 44 is then installed 206 in the fixture 80. The release agent layers 134, 140, 144 are applied 208 to the shroud components 82, 106, 110. The protective material (platinum aluminide) layers 136, 146, 148 are then applied 210 to the shroud components 82, 106, 110 over the release agent layers 134, 140, 144. The shroud components 82, 106, 110 are then applied/positioned 212 against the blade 44 as described above. Current is applied to the heating elements 122, 124, 126 to heat 214 the shroud components 82, 106, 110. The feature 70 is formed 216 by laser cladding while the shroud components 82, 106, 110 contain the cladding material to define the net-shape of the sides of the parapet 72. Concurrently, the cladding fuses the platinum aluminide layers 136, 146, 148 as the parapet 72 is built up. The cladding is allowed to cool 218 as heat is applied by the heating elements 122, 124, 126. The shroud components 82, 106, 110 are withdrawn 220 by the actuation systems 98, 108, 112. Any needed post cladding machining is conducted 222 to clean up the parapet 72 to its designed net-shape. The blade 44 is removed from the fixture 80 and assembled 224 in a matched blade set to the disk 43. The tips 68 of the blades in the matched set are machined 226 to a common outer periphery to fit within the cylindrical fixed structure 40 with the required radial gap 46. It should be appreciated that while the shroud components 82, 106, 110 contain the parapet to its net shape, the radially outermost tip requires matched set machining. The blade set and disk 43 are then assembled 228 to the engine 20 and the process 200 ends 230.

Through the foregoing, laser cladding of turbine blade tips is accomplished to net-shape using shrouds. The shrouds may be heated to reduce the incidence of defects and may be coated to apply a protective material to the cladding as cladding is carried out. While at least one exemplary embodiment has been presented in the foregoing detailed description of the inventive subject matter, it should be appreciated that a vast number of variations exist. It should also be appreciated that the exemplary embodiment or exemplary embodiments are only examples, and are not intended to limit the scope, applicability, or configuration of the inventive subject matter in any way. Rather, the foregoing detailed description will provide those skilled in the art with a convenient road map for implementing an exemplary embodiment of the inventive subject matter. It being understood that various changes may be made in the function and arrangement of elements described in an exemplary embodiment without departing from the scope of the inventive subject matter as set forth in the appended claims.

What is claimed is:

1. A method of cladding a host component, the method comprising:
   installing the host component in a fixture;
   locating a shroud component against the host component adjacent a select location for applying the cladding, wherein the shroud component comprises a structure that is temporarily inserted against the host component for containing the cladding as the cladding is applied;
   applying, by depositing material while focusing energy on the deposited material, the cladding to the host component to the select location and adjacent to the shroud component so that the shroud component defines an edge of the cladding as applied;
   withdrawing the shroud component from the host component, wherein the edge of the cladding as defined by the shroud component defines a desired cladding profile; and
   installing the host component in an application for its operation after the shroud component has been withdrawn.

2. The method of claim 1, comprising:
   applying a release agent layer to the shroud component prior to locating the shroud component against the host component;
   applying a platinum aluminide layer to the shroud component and over the release agent layer; and
   fusing, by the focused energy, the platinum aluminide layer to the host component as a result of applying the cladding.

3. The method of claim 1, comprising:
   locating a second shroud component against the host component adjacent the select location; and
   wherein applying the cladding comprises applying the cladding between the shroud components.

4. The method of claim 1, comprising heating the shroud component by a heating element during and after application of the cladding.

5. The method of claim 4, comprising allowing the cladding to cool while the heating element is heating the shroud component.

6. The method of claim 1, comprising:
   locating the shroud component against an end of the host component, wherein the host component is a blade with an airfoil shape and wherein the shroud component mimics the airfoil shape; and
   locating a second shroud component against a side wall of the host component adjacent the end, wherein the second shroud component mimics a half of the airfoil shape.

7. The method of claim 1, wherein applying the cladding comprises applying the cladding by laser cladding in the form of a parapet wall feature on an end of the host component, and comprising:
performing the laser cladding by a laser cladding tool that is guided around the shroud component by an actuation system, while simultaneously alloy powder is deposited to build up the parapet.

8. The method of claim 7, wherein the host component is a turbine blade, wherein locating a shroud component against the host component comprises:
locating a first shroud component that has an airfoil shape against the end of the blade;
locating a second shroud component against a first side of the blade; and
locating a third shroud component against a second side of the blade, wherein the first, second and third shroud components define a gap that encircles the perimeter of the end of the blade, and wherein the laser cladding is performed into the gap and around the entire perimeter.

9. The method of claim 1, comprising:
withdrawing the shroud component after applying the cladding; and
assembling the host component as a blade in an engine without machining the cladding after application.

10. The method of claim 1, wherein after applying the cladding, the cladding has a near-net quality requiring approximately no further modification of the cladding profile after application.

11. The method of claim 1, wherein applying the cladding comprises applying the cladding in the form of a parapet wall feature on an end of the host component.

12. A method of cladding a blade for a rotor of a turbine section of an engine, wherein the blade comprises an airfoil shape and has a suction side, a pressure side, and an end, the method comprising:
installing the blade in a fixture;
locating a shroud component against the blade adjacent a select location for the cladding wherein the shroud component is a shell type structure with a profile mimicking that of the airfoil shape of the blade, so that the shroud component fits against one of the pressure side in its entirety, or the suction side in its entirety;
applying the cladding to the blade at the select location and adjacent to the shroud component wherein the shroud component is temporarily inserted against the host component for containing the cladding while the cladding is applied;
containing the cladding with the shroud component, so that the shroud component defines an edge of the cladding as applied, and the cladding as applied has a desired cladding profile;
wherein the edge of the cladding as defined by the shroud component defines the desired cladding profile with a quality requiring no/approximately no further modification of the cladding profile to remove material from the cladding after application;
withdrawing the shroud component from the host component; and
installing the blade in the rotor for its operation after the shroud component has been withdrawn.

13. The method of claim 12, wherein the applying the cladding comprises depositing material while focusing energy on the deposited material, and comprising:
applying a release agent layer to the shroud component prior to locating the shroud component against the blade;
applying a platinum aluminide layer to the shroud component and over the release agent layer; and
fusing, by the focused energy, the platinum aluminide layer to the blade as a result of applying the cladding.

14. The method of claim 12, comprising:
locating a second shroud component against the blade adjacent the select location, wherein the second shroud component is a second shell type structure with a second profile mimicking that of the airfoil shape of the blade, so that the second shroud component fits against one of: all of the pressure side or all of the suction side, the shroud component and the second shroud component completely surround a perimeter of the airfoil shape in entirety; and
wherein applying the cladding comprises applying the cladding between the shroud components.

15. The method of claim 12, comprising:
heating the shroud component by a heating element during and after application of the cladding; and
allowing the cladding to cool while the heating element is heating the shroud component.

16. The method of claim 12, comprising:
locating a second shroud component against an end of the blade.

17. The method of claim 12, wherein applying the cladding comprises applying the cladding by laser cladding.

18. The method of claim 12, wherein locating a shroud component against the blade comprises:
locating a first shroud component that has an airfoil shape against the end of the blade;
locating a second shroud component against the suction side of the blade; and
locating a third shroud component against the pressure side of the blade, wherein the first, second and third shroud components define a gap that encircles the perimeter of the end of the blade, and wherein the laser cladding is performed into the gap and completely around the perimeter.

19. The method of claim 12, comprising:
withdrawing the shroud component after applying the cladding; and
assembling the blade in the engine without machining the cladding after application.

20. A method of cladding a blade for a rotor of a turbine section of an engine, the method comprising:
installing the blade in a fixture;
locating a first shroud component against an end of the blade adjacent a select location for the cladding;
locating a second shroud component against a side wall of the blade adjacent the select location;
applying a release agent layer to the shroud components prior to locating the shroud components against the blade;
applying a protective material layer over each of the release agent layers so that the protective material layers face the select location;
applying the cladding to the blade between the shroud components so that the shroud components define edges of the cladding as applied; and
fusing the protective material layers to the blade as a result of applying the cladding;
wherein the edges of the cladding as defined by the shroud components define a desired cladding profile of a near-net quality requiring approximately no further modification of the cladding profile after application.

* * * * *